(12) United States Patent
Araki et al.

(10) Patent No.: US 9,471,434 B2
(45) Date of Patent: Oct. 18, 2016

(54) STORAGE SYSTEM AND STORAGE SYSTEM FAILURE MANAGEMENT METHOD

(71) Applicant: Hitachi, Ltd., Tokyo (JP)

(72) Inventors: Akihiko Araki, Tokyo (JP); Yusuke Nonaka, Tokyo (JP); Masanori Takada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 351 days.

(21) Appl. No.: 14/360,402

(22) PCT Filed: Jul. 22, 2013

(86) PCT No.: PCT/JP2013/069745
§ 371 (c)(1),
(2) Date: May 23, 2014

(87) PCT Pub. No.: WO2015/011749
PCT Pub. Date: Jan. 29, 2015

(65) Prior Publication Data
US 2016/0196184 A1 Jul. 7, 2016

(51) Int. Cl.
*G06F 11/14* (2006.01)
*G06F 11/07* (2006.01)

(52) U.S. Cl.
CPC ....... *G06F 11/1417* (2013.01); *G06F 11/0712* (2013.01); *G06F 11/0793* (2013.01); *G06F 2201/805* (2013.01); *G06F 2201/85* (2013.01)

(58) Field of Classification Search
CPC ........... G06F 11/2092; G06F 11/0727; G06F 11/201; G06F 11/2038; G06F 11/1464; G06F 11/1666; G06F 11/0778; G06F 11/1441; G06F 11/2028
See application file for complete search history.

(56) References Cited

U.S. PATENT DOCUMENTS

| | | | | |
|---|---|---|---|---|
| 6,779,132 B2* | 8/2004 | Andress | | G06F 11/0778 714/15 |
| 7,111,084 B2* | 9/2006 | Tan | | G06F 11/201 710/15 |
| 7,697,312 B2* | 4/2010 | Tanaka | | G06F 3/0614 365/63 |
| 7,788,537 B1* | 8/2010 | Yellen | | G06F 11/0727 714/38.11 |
| 7,809,981 B2* | 10/2010 | Takada | | G06F 11/0727 714/5.11 |
| 7,966,515 B2* | 6/2011 | Hatasaki | | G06F 9/4406 714/4.2 |
| 8,312,314 B2* | 11/2012 | Takada | | G06F 11/0727 714/6.13 |
| 2005/0177770 A1* | 8/2005 | Coatney | | G06F 11/2092 714/15 |
| 2007/0006226 A1 | 1/2007 | Hendel | | |
| 2010/0083043 A1* | 4/2010 | Niioka | | G06F 11/0706 714/23 |
| 2011/0185130 A1 | 7/2011 | Hara et al. | | |

FOREIGN PATENT DOCUMENTS

| | | |
|---|---|---|
| JP | 2001-290677 A | 10/2001 |
| JP | 2008-242999 A | 10/2008 |
| JP | 2011-227766 A | 11/2011 |
| WO | 2012/090290 A1 | 7/2012 |

* cited by examiner

*Primary Examiner* — Nadeem Iqbal
(74) *Attorney, Agent, or Firm* — Volpe and Koenig, P.C.

(57) ABSTRACT

When a failure occurs in a storage system controller, the controller reboots after completing prescribed failure processing for respective control parts. Upon detecting a failure, first, second, and third control parts of the controller perform respective failure processing. The first control part controls block access requests, the second control part controls file system access, and the third control part manages the second control part. The first control part and third control part write prescribed information to a storage area and reboot at least a portion of the controller upon detecting the failure.

6 Claims, 9 Drawing Sheets

STORAGE SYSTEM AND STORAGE SYSTEM FAILURE MANAGEMENT METHOD

TECHNICAL FIELD

The present invention relates to a storage system and a storage system failure management method.

BACKGROUND ART

The creation of new value using so-called big data analysis has come to be regarded as important in recent years. Big data is huge amounts of data related to the social infrastructure, and, for example, refers to data related to social networking services, finance, medicine, transportation, and so forth. The problem with big data analysis stems from the huge amounts of data and the diversity of types of data. That is, the increasing cost of storing data and the complexity of data management have become problems to the progress of big data analysis.

A storage system is a platform for securely storing and managing data generated on a daily basis by companies and so forth. The storage system has earned an important position in the information systems that are introduced into companies and the like.

In recent years, a unified storage system has also come to be known. The unified storage system supports a plurality of types of host interface protocols for storing and managing block data and file data in an integrated fashion (Patent Literature 1). As one method for realizing a unified storage system, a mode for allowing a plurality of operating systems (OS) to coexist inside a storage system, wherein each OS provides host interface protocol processing, and data is stored in an integrated fashion in a storage apparatus inside the storage system is conceivable.

Although not prior art related to a unified storage system, a technique for specifying one of a plurality of virtual machines that exist on a hypervisor as a virtual machine for outputting a dump and allowing the dump to be outputted is also known (Patent Literature 2).

CITATION LIST

Patent Literature

[PTL 1]
US2011/0185130A1
[PTL 2]
US2007/0006226A1

SUMMARY OF INVENTION

Technical Problem

When a unified storage system has been realized using an architecture that allows a plurality of OSs to coexist inside a storage system, so-called failure processing, that is, the detection of and recovery from a failure that has occurred in the storage system, becomes a problem.

The storage system securely stores information produced by a company. Therefore, the storage system is necessary for providing advanced failure processing for realizing high reliability and high availability. In addition, when a failure occurs, the storage system must be able to accurately identify the cause of the failure, and, as needed, replace a piece of hardware and/or an OS. In the case of an OS replacement, a program of the OS for correcting the problem may be applied.

In order to accurately identify the cause of a failure, a memory dump for saving the contents of memory as a dump file is necessary. The state of the OS at the time point when the failure occurred is reflected in information that has been written to the dump file, thereby making it possible to confirm the process that constituted the cause of the failure, and to check for the presence or absence of invalid data.

When a failure occurs in a unified storage system in which a plurality of OSs coexist, to the extent possible, it is necessary to acquire memory dumps from all the OSs. However, in the unified storage system, when each OS randomly outputs a memory dump, there can be more than one dump output destination and the timing of the dump outputs can differ, thereby making it difficult to acquire the dump data needed for failure analysis. Also, when another OS reboots the storage system while a certain OS is in the process of outputting a memory dump, the memory dump of the certain OS cannot be properly acquired.

With the foregoing problems in view, an object of the present invention is to provide a storage system and a storage system failure management method that are capable of enhancing reliability and availability by rebooting after confirming the completion of prescribed failure processing for a plurality of control parts of the storage system.

Solution to Problem

A storage system according to one aspect of the present invention for solving the above-mentioned problems comprising: in a storage system having a plurality of control parts, a controller that has a microprocessor and a memory used by the microprocessor, and that realizes the plurality of control parts using the microprocessor; a logical volume controlled by the controller; a first control part that is included in the plurality of control parts and controls a block access request to a disk device; a second control part that is included in the plurality of control parts and performs prescribed processing; and a third control part that is included in the plurality of control parts and manages the second control part, wherein the controller, when a failure has occurred inside the controller, reboots after confirming that prescribed failure processing has been completed for the first, second, and third control parts.

Additional features of the present invention should become clear from the description in this specification and the attached drawings. Also, the aspects of the present invention are achieved and realized based on elements, combinations of various elements, and the detailed description that follows.

It should be understood that the description in this specification is nothing more than a typical example, and in no sense limits either the claims or the application examples of the present invention.

Advantageous Effects of Invention

According to the present invention, when a failure occurs, it is possible to reboot after the completion of prescribed failure processing for each control part, thereby enabling the reliability and availability of the storage system to be enhanced.

DESCRIPTION OF EMBODIMENT

The embodiment of the present invention will be explained below on the basis of the drawings. In the attached drawings, elements that are functionally the same may be displayed using the same number. The attached drawings show a specific embodiment and examples that conform to the principle of the present invention. The embodiment and examples are for understanding the present invention, and are not used for interpreting the present invention in a limited manner.

The embodiment is explained fully and in detail so that a person skilled in the art can put the present invention into practice, but other examples and aspects of the present invention are also possible. It should be understood that the configuration or structure can be changed and various elements can be interchanged without departing from the scope or spirit of the technical idea of the present invention. Therefore, the following description should not be interpreted as limiting the present invention thereto.

In addition, the embodiment of the present invention, as will be described hereinbelow, may be implemented with software that runs on a general-purpose computer, may be implemented using dedicated hardware, or may be implemented using a combination of software and hardware.

Figure 1:
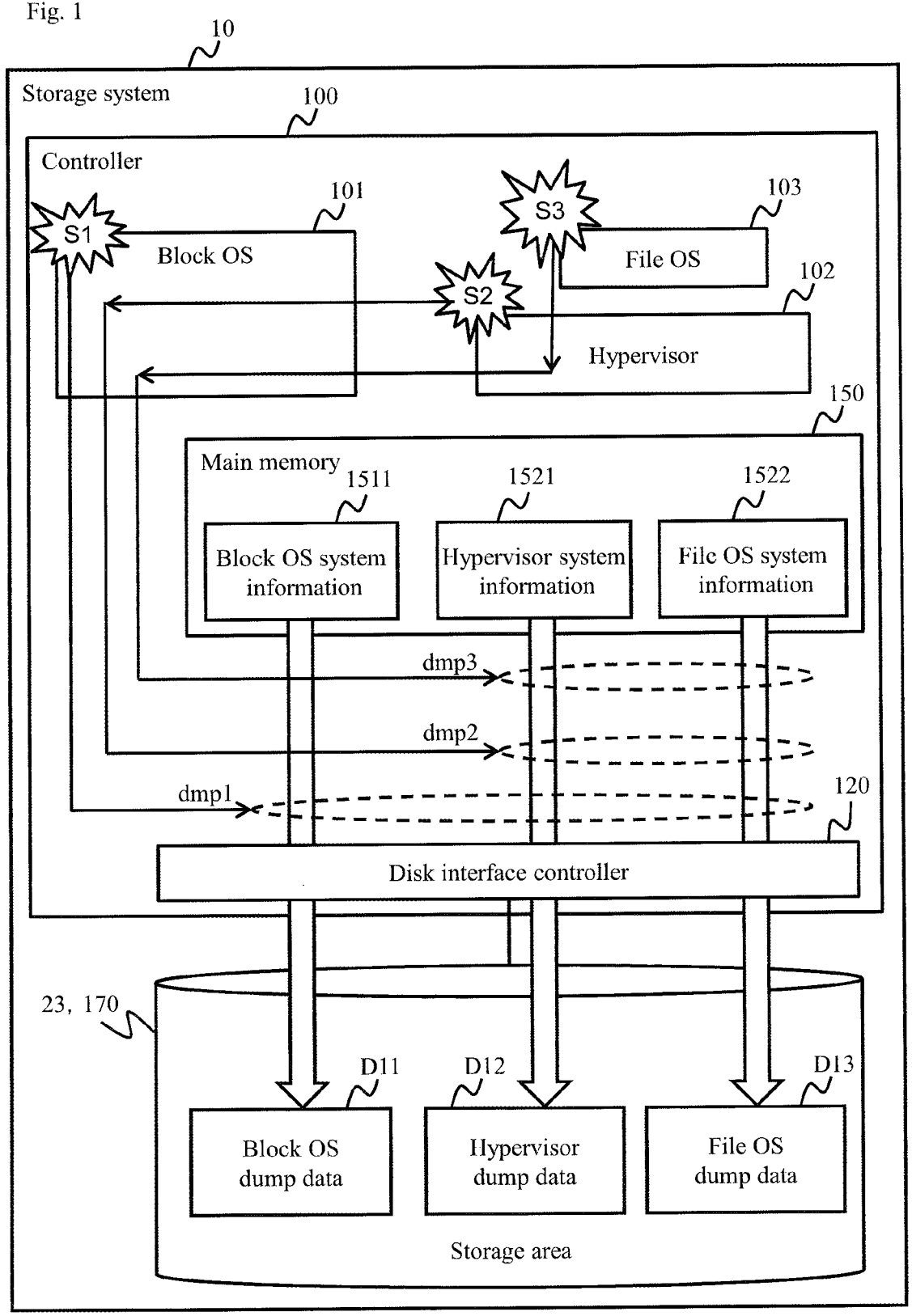
FIG. 1 is an illustration showing an overview of the embodiment.

FIG. 1 is an illustration showing an overview of one embodiment of the present invention. FIG. 1 has been prepared in order to understand the embodiment, and the present invention is not limited to the configuration example shown in FIG. 1.

A storage system 10 is a unified storage system that can process a file access request and a block access request in a single system, and when a failure occurs, a plurality of control parts 101, 102 and 103 inside a controller 100 check whether prescribed failure processing has ended. The storage system 10 of the embodiment reboots the storage system when completion of the prescribed failure processing has been confirmed.

The storage system 10 comprises as a first control part a block OS 101 for processing a block access request (block I/O). In addition, the storage system 10 comprises as a second control part a file OS 103 for processing a file access request, and a hypervisor 102 as a third control part for managing the file OS 103. In this example, the hypervisor 102 is also treated as a kind of operating system.

In this example, the block OS 101 plays a central role in the controller 100, and all block access requests are executed via the block OS 101. The block OS 101 is independent from the hypervisor 102, and only the hypervisor 102 is capable of rebooting without stopping the block OS 101. By contrast, the hypervisor 102, which manages the file OS 103, reboots together with the block OS 101 whenever the latter reboots. Only the block OS 101 is incapable of rebooting without stopping the hypervisor 102.

Only the block OS 101 is able to access a storage device (a disk storage device 21). The block OS 101 is a failure management mechanism for managing a storage system 10 failure, and executes a memory dump, which is an example of prescribed failure processing. In addition, the block OS 101 identifies a range required for a memory dump in accordance with the location where the failure occurred, and after confirming that the required memory dump processing has been completed, reboots a microprocessor in the required range. The OS is reconstructed and run when rebooting the microprocessor. In the following explanation, a memory dump may be abbreviated as dump.

The file OS 103 operates on a virtual machine formed by the hypervisor 102, and inputs/outputs files to/from a file system. The file OS 103 for controlling file input/output (I/O) will be explained below without making a special distinction between the file OS and the virtual machine by giving a second control part as a typical example. The process for controlling file I/O corresponds to "prescribed processing". Furthermore, one or more virtual machines (second control parts) can run on the hypervisor 102. The second control part is not limited to the file OS 103, and, for example, may be an OS provided with a data compression function, an OS provided with a data high-speed retrieval function, or an OS provided with a data remote copy function.

The storage system 10 can preferentially allocate the minimum hardware resources required to the block OS 101, and divide up the remaining hardware resource between the hypervisor 102 and the file OS 103.

Figure 2:
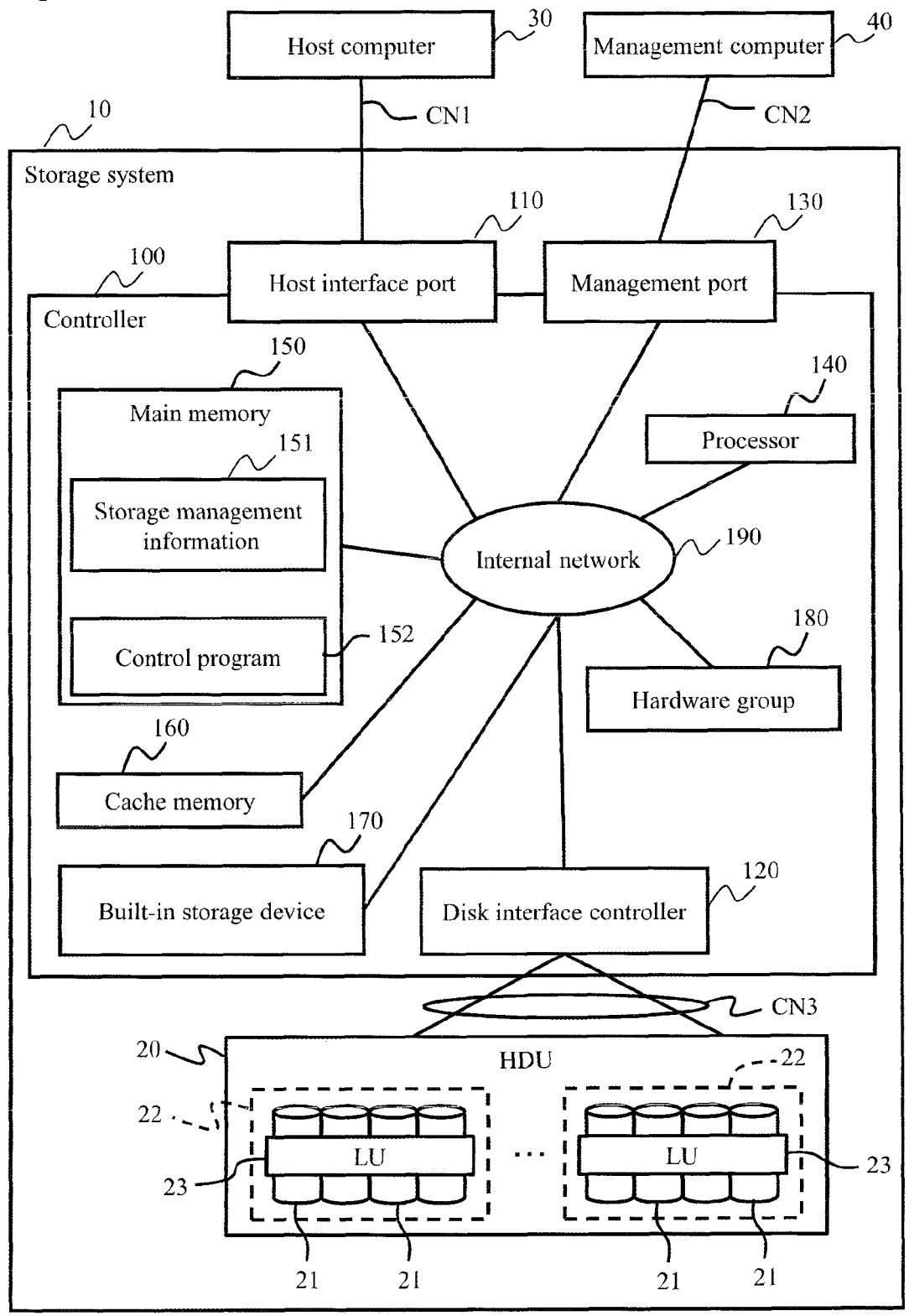
FIG. 2 is an illustration showing the configuration of a block of a storage system.

The hardware resources include a processor core, such as a microprocessor 140, and a main memory 150 as shown in FIG. 2. At least a portion of the hardware resources is divided into a part used by the block OS 101 and a part used by the hypervisor 102. The block OS 101 always secures the minimum required hardware resources, and as such, can appropriately perform failure processing even under conditions in which large numbers of file access requests are being issued from the host computer. The respective OSs may be shared in accordance with the type of hardware resource.

A block OS area 1510, a hypervisor area 1520, and a shared area 1530 are provided in the main memory 150 as will be described using FIG. 3. The block OS area 1510 stores system information 1511 for the block OS 101. The hypervisor area 1520 stores system information 1521 for the hypervisor 102. The shared area 1530 stores an inter-OS communication table 1531 for communications between the block OS 101 and the hypervisor 102.

Figure 3:
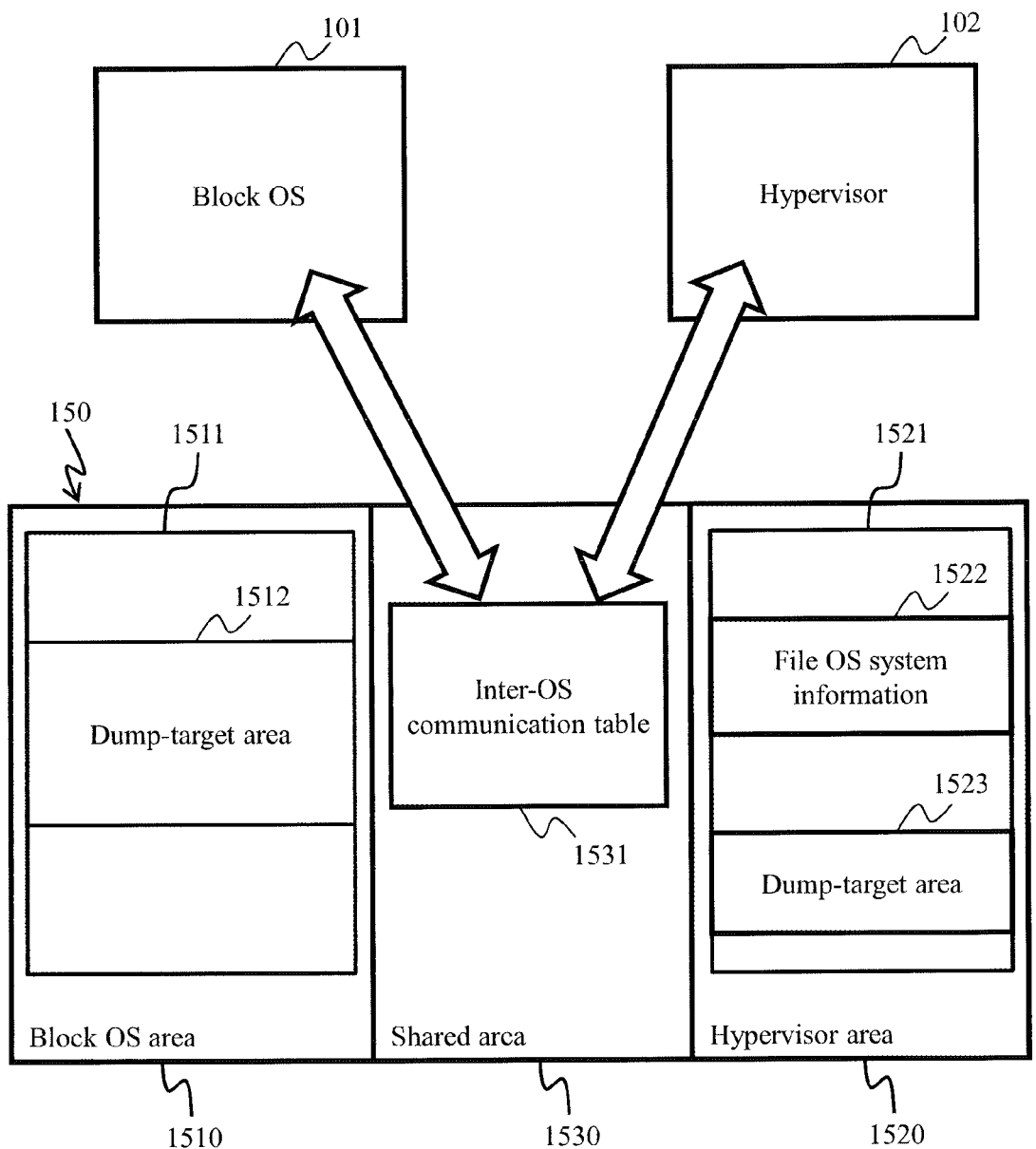
FIG. 3 is an illustration showing the contents of storage management information stored in a memory, and a communication method between a block OS and a hypervisor.

As shown in FIG. 3, system information 1522 for the file OS 103 (virtual machine) that runs on the hypervisor 102 can also be stored in the hypervisor area 1520. As used here, system information is basic information required for operating the respective OSs 101, 102, and 103. In the storage system 10, the OS that is capable of operating independently may be the block OS 101 alone, or both the block OS 101 and the hypervisor 102 may be capable of operating independently. In this example, it is assumed that only the block OS 101 is capable of operating independently. It is assumed that when the block OS 101 reboots as a result of a failure or the like, the hypervisor 102 also reboots at the same time.

In this example, as shown in FIG. 3, the block OS 101 can reference all of the areas 1510, 1520, and 1530 in the main memory 150. It is assumed that the hypervisor 102 can only reference a portion of the main memory 150 (for example, the hypervisor area 1520 and the shared area 1530). The system information 1521 for the hypervisor 102 and the system information 1522 for the file OS 103 are stored in the hypervisor area 1520.

A disk interface controller 120 for controlling data input/output to/from a disk storage apparatus 23 is monopolized by the block OS 101. The disk storage apparatus 23, as will be described using FIG. 2, is a logical storage apparatus configured using either one or a plurality of physical storage devices 21.

Only the block OS 101 is capable of reading/writing data from/to the disk storage apparatus 23 via the disk interface controller 120. The hypervisor 102 and the file OS 103 are unable to use the disk interface controller 120 directly.

The block OS 101 monopolizes the disk interface controller 120, thereby doing away with the need for performing exclusive control for the other OSs 102 and 103, and making it possible to process disk I/O at high speed. When a host computer 30 (FIG. 2) requests a file I/O, the file OS 103 is in charge of file protocol processing, and the block OS 101 is in charge of block data I/O with respect to the disk storage apparatus 23.

The block OS 101, upon detecting a failure in its own block OS 101 (S1), executes a memory dump for a pre-configured first dump range dmp1. The block OS system information 1511, the hypervisor system information 1521, and the file OS system information 1522 are included in the first dump range dmp1. These prescribed pieces of information 1511, 1521, and 1522 are stored as dump data D11, D12, and D13 in a prescribed storage area.

The block OS system information 1511 is stored in the block OS dump data D11 in the prescribed storage area. The hypervisor system information 1521 is stored in the hypervisor dump data D12 in the prescribed storage area. The file OS system information 1522 is stored in the file OS dump data D13 in the prescribed storage area.

Numerous OS memory dumps are required to analyze the cause of a failure, and as such, when a failure (S1) occurs in the block OS 101, not only the system information 1511 for the block OS 101, but also the system information 1521 for the hypervisor 102 and the system information 1522 for the file OS 103 are also dumped to the prescribed storage area from the main memory 150.

In addition, in this example, only the block OS 101 can operate independently, and the microprocessor 140 must be rebooted pursuant to a failure having occurred in the block OS 101. Accordingly, the hypervisor system information 1521 and the file OS system information 1522, which are lost as the result of rebooting the microprocessor 140, are also dump targets.

This makes it possible to prevent a situation in which the microprocessor 140 reboots while the system information 1521 and 1522 for the other OSs 102 and 103 is being dumped, resulting in the loss of the system information 1521 and 1522. A configuration in which the block OS 101 performs memory dump processing only for the block OS system information 1511, and the hypervisor 102 performs memory dump processing for the hypervisor system information 1521 and the file OS system information 1522 is also conceivable. However, in this case, the block OS 101 would have to wait long enough for the dump processing by the hypervisor 102 to be completed, thereby raising fears of downtime increasing when a failure occurs. Accordingly, in this example, the block OS 101 performs the memory dump processing for all the dump data (dump-target data).

The dump data output destination may be the logical volume 23 for storing dump data, may be a built-in storage device 170, or may be a management computer 40. The "prescribed storage area", which is the dump data output destination, may exist either inside or outside of the controller 100, and the configuration may be such that the respective dump data is stored in a plurality of locations.

The block OS 101, upon detecting a failure (S2) in the hypervisor 102 in a case where the block OS 101 is operating normally, executes a memory dump for a pre-configured second dump range dmp2. The second dump range dmp2 includes the hypervisor system information 1521. The system information 1522 of the file OS 103 operating on the hypervisor 102 may also be transferred from the main memory 150 to the prescribed storage area collectively as part of the hypervisor system information 1521.

The hypervisor 102, upon detecting a failure in the file OS 103 in a case where the hypervisor 102 is operating normally (S3), executes a memory dump for a pre-configured third dump range dmp3. The third dump range dmp3 includes the file OS system information 1522.

The block OS 101 is in charge of all of the memory dump processing in the respective dump ranges dmp1, dmp2 and dmp3. That is, the block OS 101 transfers prescribed information (dump data) stored in the main memory 150 to the prescribed storage apparatus. Since only the block OS 101 is able to access the disk storage apparatus 23, the block OS 101 executes memory dump processing in place of the other OSs 102 and 103. The block OS 101, which is the most robust OS, manages all memory dump processing in a unified manner, thereby making it possible to store all the dump data (dump-target data) required for failure analysis in the prescribed storage area, increasing reliability.

Embodiment 1

FIG. 2 shows the apparatus configuration of a storage system in this embodiment. The storage system 10 is connected to at least one host computer 30 via a first communication path CN1. In addition, the storage system 10 is connected to a management computer 40 via a second communication path CN2. The storage system 10 controller 100 is connected to each storage device 21 inside a storage device mounting part (HDU in the drawing) 20 via a third communication path CN3. The communication paths CN1, CN2, and CN3, for example, may be formed as an Internet protocol (IP) network, such as the Internet or a local area network (LAN). Or the communication paths CN1, CN2, and CN3 may be formed using a fibre channel storage area network (FC-SAN). The configuration may be such that any two or all of the communication paths CN1, CN2, and CN3 are provided on a common communication network.

The storage system 10 comprises a controller 100 for controlling the entire apparatus, and an HDU 20 controlled by the controller 100. The controller 100 comprises one or more, respectively, of a host interface port 110, a disk interface controller 120, a management port 130, a microprocessor 140, a main memory 150, a cache memory 160, a built-in storage device 170, a hardware group 180, and an internal network 190.

The host interface port 110 is connected to the host computer 30 via the first communication path CN1, and communicates with the host computer 30. The storage system 10 controller 100 uses the host interface port 110 to receive an I/O from the host computer 30, and to return the I/O processing result to the host computer 30. The host computer 30, for example, has application programs, such as a document preparation application, a drawing application, an electronic mail management application, a motion picture distribution application, and an online game application, and stores data used by the application programs in the storage system 10.

The disk interface controller 120 reads/writes data from/to a storage device 21 mounted in the storage device mounting part 20. For example, various storage devices capable of reading and writing data, such as a hard disk device, a semiconductor memory device, an optical disk device, and a magneto-optical disk device, can be used as storage devices here.

When using a hard disk device as a storage device, for example, it is possible to use a fibre channel (FC) disk, a small computer system interface (SCSI) disk, a SATA disk, an AT attachment (ATA) disk, and a serial attached SCSI (SAS) disk.

Also, a variety of storage devices can be used, such as, for example, a flash memory, a ferroelectric random access memory (FeRAM), a magnetoresistive random access memory (MRAM), a phase-change memory (Ovonic Unified Memory), a phase-change random access memory (PRAM (registered trademark)), and a resistive random access memory (ReRAM). In addition, for example, different types of storage devices, like a flash memory device and a hard disk device, may coexist in the HDU 20.

Physical storage areas of one or more physical storage devices 21 are virtualized as a group of redundant arrays of inexpensive disks (RAID) 22, and storage areas 23 of either a prescribed size or variable sizes are segmented from the RAID group 22 storage area. This storage area 23 is a logical storage area, and is called a logical unit or a logical volume. In this example, the logical storage area will be called a logical volume 23. The logical volume 23 stores data (user data) and so forth used by the host computer 30.

The logical volume 23 may be a virtual volume that uses the so-called thin provisioning technique. For example, a storage area (page) of a pooled logical volume 23 is first allocated to a virtual volume when the size of the virtual volume has been defined and data has been written to the virtual volume from the host computer 30. This makes it possible to present the host computer 30 with a large size virtual volume and to tailor the storage area that is actually being used to the size of the user data. The storage resources of the storage system 10 can be used effectively as a result.

The HDU 20 need not be provided inside the same enclosure as that of the controller 100, and may be provided in an enclosure that differs from that of the controller 100. Also, for example, a plurality of HDUs 20 can be connected in daisy-chain fashion.

The management port 130 is connected to the management computer 40 via the second communication path CN2. The management computer 40 is for managing the storage system 10. The management computer 40 acquires from the storage system 10 various states of the storage system 10 (for example, the processor utilization rate, the amount of memory in use, input output per second (TOPS), storage device status, and so forth), and outputs the states to an information output device. The management computer 40 inputs a management command inputted to an information input device by a system administrator or other such user to the storage system 10 via the second communication path CN2 and the management port 130, and acquires a response to the management command from the storage system 10.

The microprocessor (processor in the drawing) 140 comprises a plurality of processor cores, and realizes a command processing function (not shown in the drawing), the block OS 101, the hypervisor 102, and the file OS 103 by executing a control program 152 stored in the main memory 150.

The main memory 150 stores storage management information 151 used in the overall management of the storage system 10. In addition, the main memory 150 stores the control program 152 for implementing processing corresponding to an I/O request from the host computer 30 and/or a management command from the management computer 40, and for implementing the respective OSs 101, 102, and 103.

The cache memory 160 temporarily stores user data received from the host computer 30, and user data read from the logical volume 23. The main memory 150 and the cache memory 160 can also be provided on the same memory. For example, the configuration may be such that a part of an area comprising one or a plurality of memories is used as the main memory, and the other area is used as the cache memory.

The built-in storage device 170 is a nonvolatile storage device mounted inside the controller 100, and either together with the logical volume 23 or in place of the logical volume 23, configures the "the prescribed storage area". The built-in storage device 170, for example, is a hard disk drive, a flash memory device, or the like. The built-in storage device 170 can be used as a backup for the main memory 150 and/or the cache memory 160, can be used to store an OS boot image, or can be used as a dump data storage destination.

The hardware group 180, for example, is various types of hardware, such as a timer for detecting a block OS 101 backup, a power source apparatus, a temperature sensor, and a cooling fan. These pieces of hardware are joined together by the internal network 190, and are capable of communicating with one another.

The relationships between the hardware resources and the OSs of the storage system 10 will be explained. Either the block OS 101 or the hypervisor 102 may be statically allocated to each processor core in the processor 140. Or, the allocation of the processor cores may be dynamically interchanged between the block OS 101 and the hypervisor 102.

The main memory 150 and the cache memory 160 may statically determine address ranges for use by the block OS 101 and the hypervisor 102, respectively, and each OS may make use of addresses within the determined address ranges. Or, an address range used by the block OS 101 and an address range used by the hypervisor 102 may be interchanged between the block OS 101 and the hypervisor 102. Also, an address range capable of being commonly referenced and updated by both OSs 101 and 102 may be provided. In the following explanation, an address range may be called an address area.

OS referenceable ranges and updatable ranges in the storage management information 151 will be explained using FIG. 3. The main memory 150 is partitioned into a block OS area 1510, a hypervisor area 1520, and a shared area 1530.

The block OS area 1510 is the area that can be referenced and updated only by the block OS 101, and stores the block OS system information 1511. Either all or a prescribed part of the block OS system information 1511 constitutes a dump-target area 1512.

The hypervisor area 1520 is the area that is referenced and updated by the hypervisor 102. The block OS 101 is able to reference the entire main memory 150, and as such can also reference the hypervisor area 1520. The hypervisor system information 1521 is stored in the hypervisor area 1520.

The hypervisor system information 1521 includes the file OS system information 1522 of the file OS 103 that runs on the hypervisor 102, and a dump-target area 1523 for the hypervisor 102. When a failure occurs in the hypervisor 102, either the dump-target area 1523 of the hypervisor system information 1521 or the dump-target area 1523 and the file OS system information 1522 are transferred to the prescribed storage area.

The portion of the address range of the hypervisor area 1520 that becomes the dump-target area 1523 will differ in accordance with the conditions at the time. Therefore, in this embodiment, as will be explained below, the hypervisor 102 clearly indicates the address range of the dump-target area 1523 in the hypervisor system information 1521 to the block OS 101, and requests that the block OS 101 perform a memory dump process.

The areas capable of being updated by the block OS 101 are the block OS system information 1521 and the shared area 1530. The block OS 101 is capable of referencing all of the areas 1510, 1520, and 1530. The areas capable of being updated by the hypervisor 102 are the hypervisor system information 1521 exclusive of the file OS system information 1522, and the shared area 1530. The areas capable of being referenced by the hypervisor 102 are the shared area 1530, and the hypervisor system information 1521 inclusive of the file OS system information 1522.

The file OS 103 is able to reference and update only the file OS system information 1522.

The shared area 1530 can be referenced and updated by both the block OS 101 and the hypervisor 102. Accordingly, in this embodiment, the two OSs 101 and 102 communicate with each other via in inter-OS communication table 1531 provided in the shared area 1530. For example, communications for notifying one another of failure information, and heartbeat communications indicating the operating status of the two OSs 101 and 102 are included in the communications between the OSs.

Figure 4:
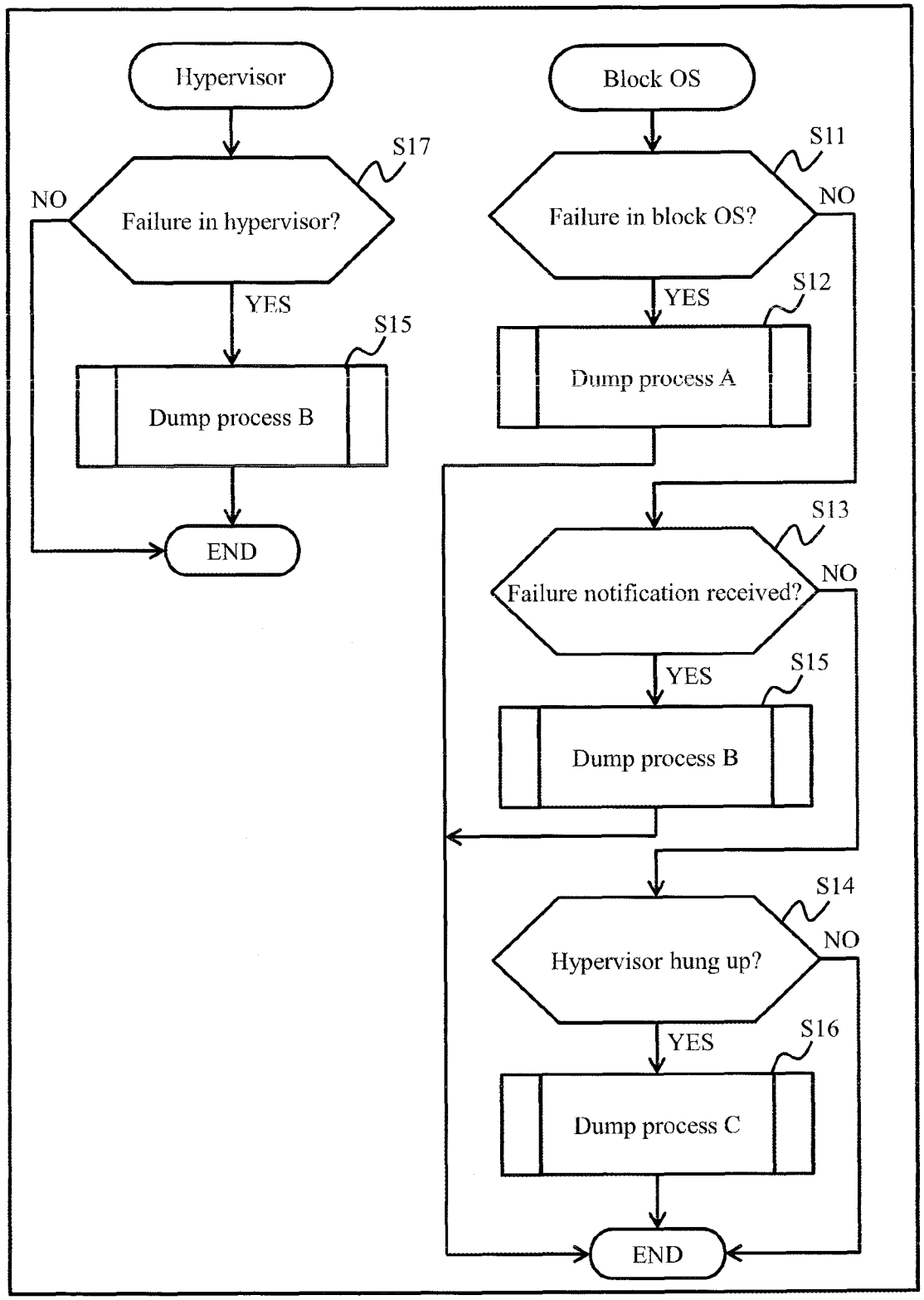
FIG. 4 is a flowchart showing the processing when a failure has been detected.

Examples of memory dump processing will be explained using FIGS. 4 through 8. FIG. 4 is a flowchart showing failure processing by the block OS 101 and the hypervisor 102. The failure processing by the hypervisor 102 is shown on the left side of FIG. 4, and the failure processing by the block OS 101 is shown on the right side of FIG. 4.

The processing of the block OS 101 will be explained first. It is assumed that the block OS 101 is the doer of the action in the following processing.

The block OS 101 determines whether or not a failure has occurred in the block OS 101 (S11). For example, a failure is determined to have occurred in the block OS 101 when various processes by the block OS 101 have not ended properly, and/or when an internal function return value was an error value.

When it has been determined that a failure has occurred in the block OS 101 (S11: YES), the block OS 101 advances to dump process A (S12). The dump process A shown in Step S12 will be explained in detail below using FIG. 5. Alternatively, when it has been determined that a failure has not occurred in the block OS 101 (S11: NO), the block OS 101 determines whether or not a failure notification was received from the hypervisor 102 (S13).

The failure notification from the hypervisor 102 is information for notifying the block OS 101 that a failure has occurred in the hypervisor 102, and, for example, can be realized by an inter-OS communication via the shared area 1530, or an interrupt. The block OS 101 may be notified of the occurrence of a failure in the hypervisor 102 using a method other than these. The block OS 101 may determine the presence or absence of a failure notification by regularly checking the shared area 1530.

When it has been determined that a failure notification has been received from the hypervisor 102 (S13: YES), the block OS 101 executes a dump process B, which will be explained below using FIG. 7 (S15). When it has been determined that a failure notification has not been received from the hypervisor 102 (S13: NO), the block OS 101 determines whether or not the hypervisor 102 is hang-up (S14). A hang-up is a state in which the hypervisor 102 has stopped operating and a reboot is required.

The block OS 101, for example, can use the shared area 1530 to carry out heartbeat communications with the hypervisor 102. For example, when heartbeat communications have been interrupted for a prescribed period of time or longer, the block OS 101 can determine that the hypervisor 102 is hang-up.

When it has been determined that the hypervisor 102 is hang-up (S14: YES), the block OS 101 executes a dump process C, which will be explained below using FIG. 8 (S16). When it has been determined that the hypervisor 102 is not hang-up (S14: NO), the block OS 101 ends the processing.

The block OS 101 may implement the above-described processing (S11 through S16) at regular intervals, or may implement the processing of Step S11 and the processing of Steps S13 and S14, respectively, at different times.

Next, hypervisor 102 failure processing will be explained. It is assumed that the hypervisor 102 is the doer of the action in the following processing. The hypervisor 102 determines whether a failure has occurred in the hypervisor 102 (S17). The hypervisor 102, for example, can perform a self check using a method identical to that described in Step S11.

When it has been determined that a failure has occurred in the hypervisor 102 (S17: YES), the hypervisor 102 executes the dump process B, which is one of the prescribed failure processes (S15). The dump process B will be explained in detail using FIG. 8. The above processing may also be implemented by the hypervisor 102 at regular intervals, or may be implemented each time the internal processing of the hypervisor 102 ends.

The dump process A shown in Step S12 in FIG. 4 will be explained in detail using FIG. 5. The dump process A is implemented when a failure has been detected in the block OS 101.

The block OS 101 issues a failure notification to the hypervisor 102 (S21). The block OS 101 prepares for a memory dump to the hypervisor 102 by notifying the hypervisor 102 of information regarding the failure that has occurred in the block OS 101. The failure notification from the block OS 101 to the hypervisor 102, for example, can be carried out using an inter-OS communication via the shared area 1530.

The hypervisor 102, upon receiving the failure notification from the block OS 101 (S27), requests that the block OS 101 perform a dump output (S28). Only the block OS 101 is capable of directly operating the disk interface controller 120, and as such, the hypervisor 102 requests that the block OS 101 write the dump data to the logical volume 23 when the dump-destination storage area is the logical volume 23. The request from the hypervisor 102 to the block OS 101 for a dump output, for example, can be carried out using an inter-OS communication via the shared area 1530.

In conjunction with a dump output request in Step S28, the hypervisor 102 may notify the block OS 101 of the memory address range in the hypervisor system information 1521 required for the hypervisor 102 memory dump. This makes it possible to narrow down the dump-target data of the hypervisor system information 1521 to a sufficient amount required for the memory dump, enabling the capacity of the hypervisor dump data D12 shown in FIG. 1 to be reduced.

Following Step S28, the hypervisor 102 waits for the processor 140 to be rebooted by the block OS 101 (S29).

Following Step S21, the block OS 101 implements a memory dump process, which will be explained below using FIG. 6 (S22). The block OS 101, after ending the processing of Step S22, receives the dump output request from the hypervisor 102 (S23). The block OS 101 determines whether a dump output request from the hypervisor 102 was detected (S24). When the dump output request from the hypervisor 102 was detected (S24: YES), the block OS 101 executes another memory dump process, which will be explained below using FIG. 6 (S25). When the dump output request from the hypervisor 102 was not detected (S24: NO), the block OS 101 returns to Step S23 and waits for the request from the hypervisor 102.

In preparation for a case in which a failure has spread to the hypervisor 102, the block OS 101 may advance to Step S25 and execute the memory dump process when the dump output request from the hypervisor 102 has not been detected after a prescribed period of time or longer has elapsed. The dump-target memory area of the memory dump process shown in Step S22 differs from that of the memory dump process of Step S25, and therefore will be explained below using FIG. 6.

Finally, the block OS 101 reboots the entire processor 140, and restarts the OSs 101 and 102 (S26). In this embodiment, the block OS 101 reboots the processor 140 after implementing a hypervisor 102 memory dump in Steps S23, S24 and S25. Therefore, the block OS 101 is able to output until the end without suspending the hypervisor 102 memory dump, making it possible to improve the dump data collection rate.

Figure 5:
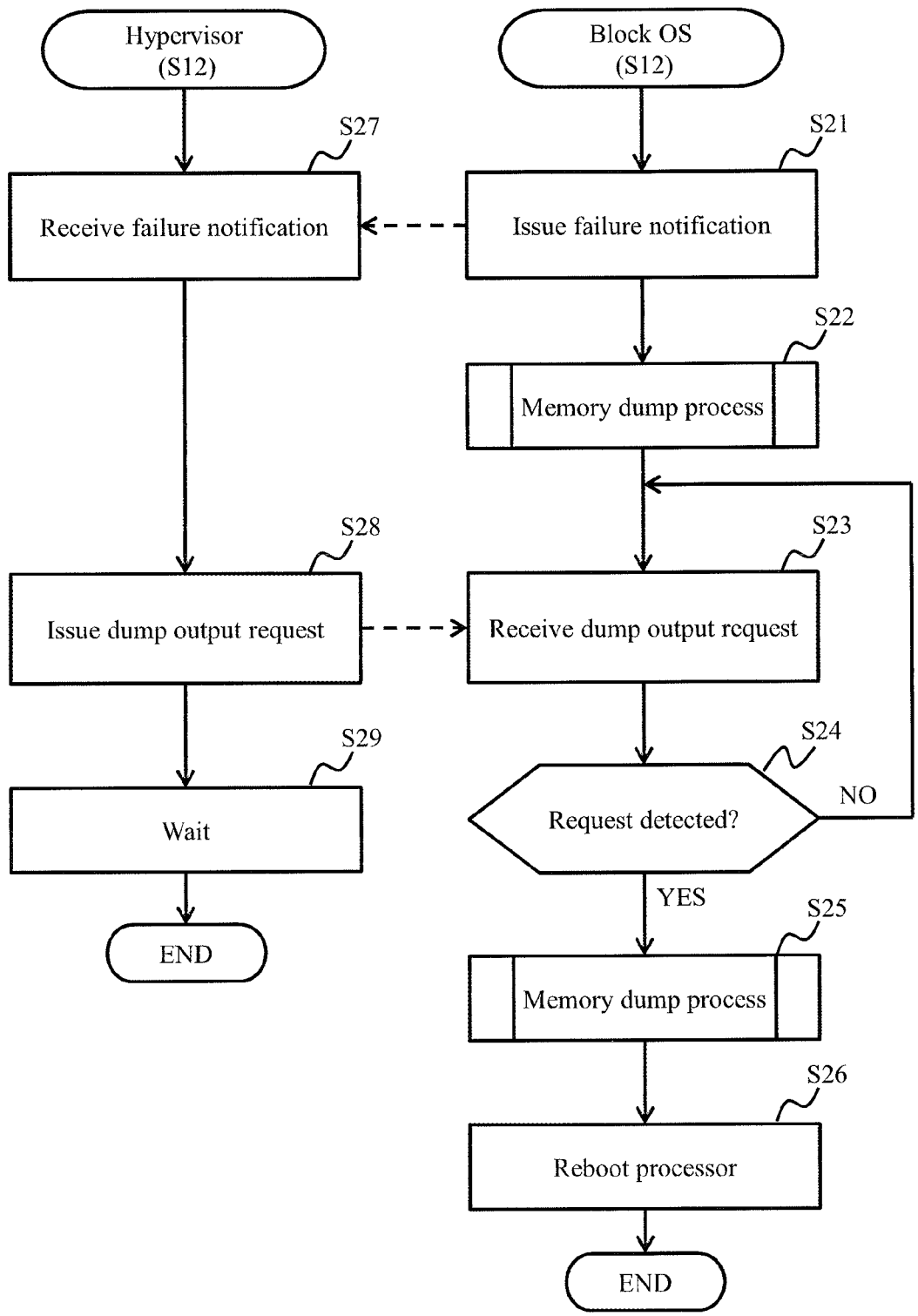
FIG. 5 is a flowchart showing Step S12 in FIG. 4 in detail.
Figure 6:
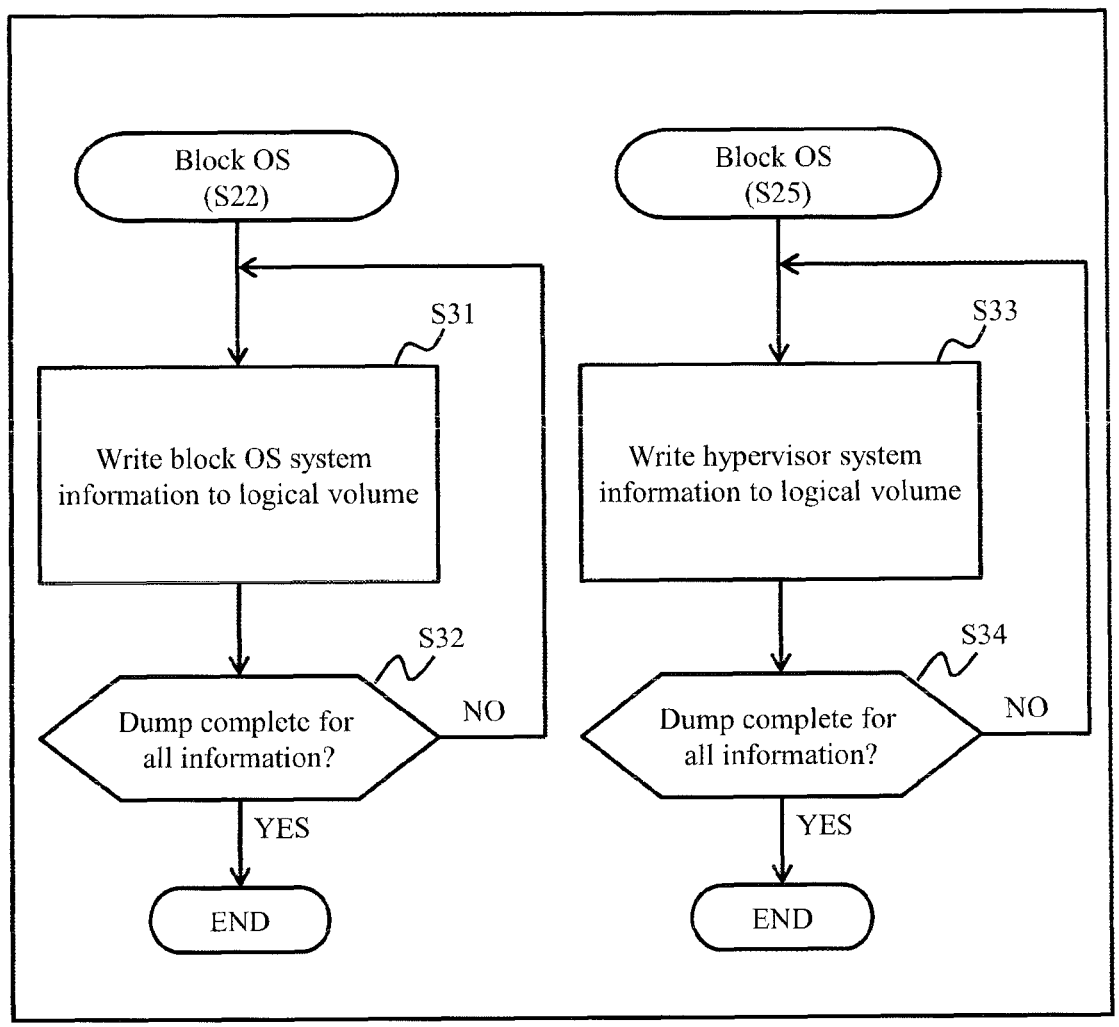
FIG. 6 is a flowchart showing Steps S22 and S25 in FIG. 5 in detail.

FIG. 6 is a flowchart showing the processing of Steps S22 and S25 in FIG. 5. The block OS 101 is in charge of all the processing shown in FIG. 6. The processing of Step S22 will be explained first.

The block OS 101 writes the block OS system information 1511 to the logical volume 23, and creates the block OS dump data D11 shown in FIG. 1. Next, the block OS 101 determines whether the dump of all the information has been completed, that is, whether all of the dump-target data has been written to the logical volume 23 (S32). When it is determined that there is data that has still not been dumped (S32: NO), the block OS 101 returns to Step S31 and dumps the unprocessed dump-target data. When it is determined that all of the dump-target data for the block OS 101 has been written from the main memory 150 to the logical volume 23 (S32: YES), the block OS 101 ends the processing.

The processing of Step S25 shown on the right side of FIG. 6 will be explained. The block OS 101 writes the hypervisor system information 1521 to the logical volume 23, and creates the hypervisor dump data D12 (S33).

In Step S33, when the memory address area of the hypervisor system information 1521 to be dumped from the hypervisor 102 is specified in the dump output request received in Step S23 of FIG. 5, the block OS 101 needs to write only the data in the specified area to the logical volume 23.

When the memory address area of the hypervisor system information 1521 has not been specified in the dump output request, the block OS 101 can write all the areas of the hypervisor system information 1521 to the logical volume 23 as the dump-target data.

Finally, the block OS 101 determines whether there is unprocessed dump-target data the same as was explained in Step S32 (S34), and when it is determined that undumped data remains (S34: NO), returns to Step S33. When it is determined that dump processing has been completed (S34: YES), the block OS 101 ends the processing.

Both the processing of Step S22 and the processing of Step S25 are processes for creating dump data, but the memory data constituting the dump target differs. In the processing of Step S25, of all the data stored in the hypervisor area 1520, only the data in the hypervisor 102-specified area is the dump-target data. Therefore, the size of the hypervisor dump data D12 can be reduced, and the time required until dump completion can be shortened. As a result, downtime can be reduced and storage system 10 availability is improved.

Figure 7:
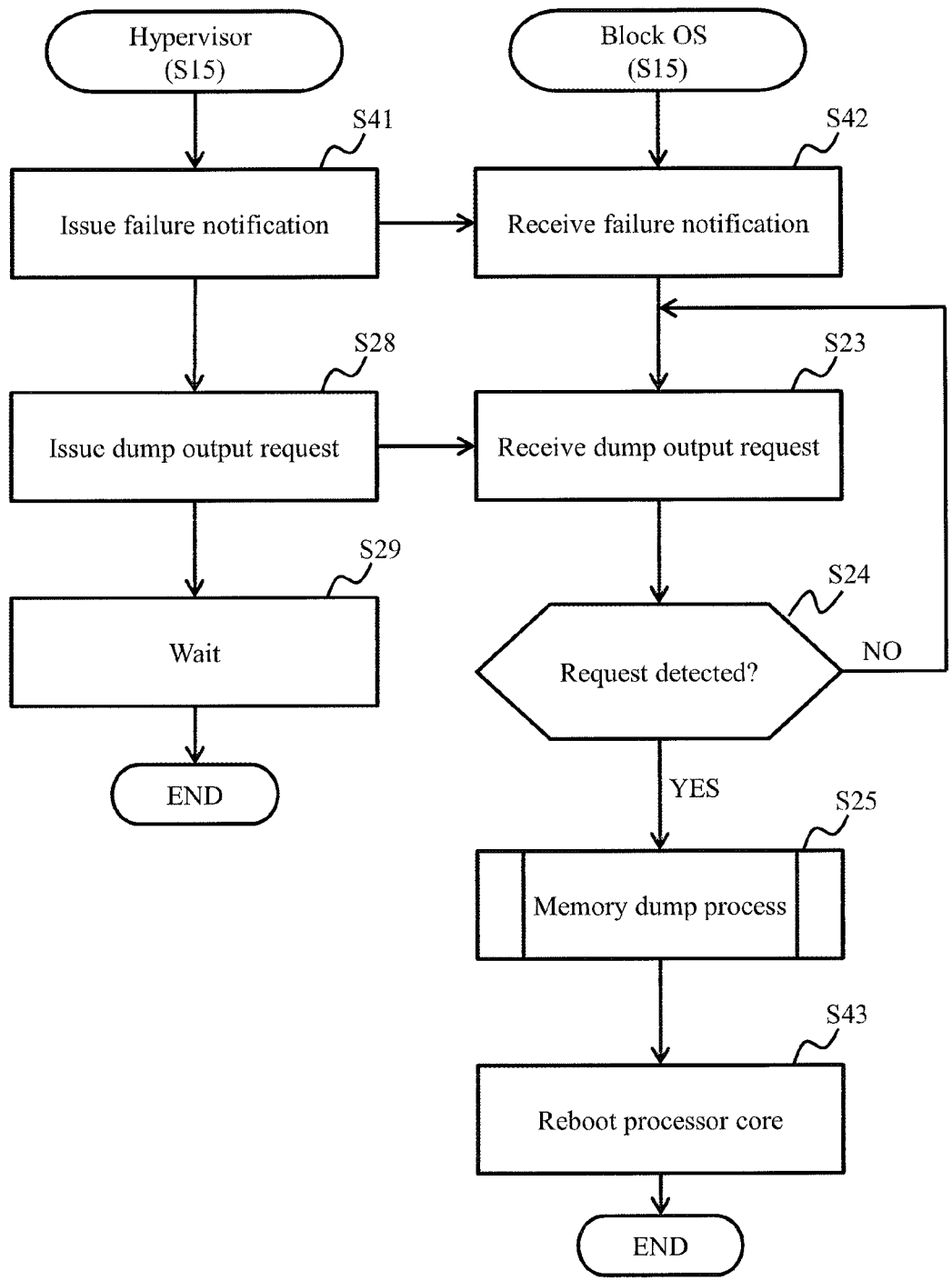
FIG. 7 is a flowchart showing Step S15 in FIG. 4 in detail.

FIG. 7 is a flowchart explaining in detail the dump process B shown in Step S15 in FIG. 4. The flowchart of FIG. 7 has portions in common with the flowchart of FIG. 5, and as such, the explanation here will focus on the differences with FIG. 5.

The hypervisor 102 advances to this processing when a hypervisor 102 failure has been detected. Accordingly, the hypervisor 102 issues the block OS 101 a notification to the effect that the occurrence of a failure in the hypervisor 102 has been detected (S41). The failure notification from the hypervisor 102 to the block OS 101 can be carried out using either an inter-OS communication via the shared area 1530, or an interrupt. The hypervisor 102, after issuing the failure notification, issues the above-described dump output request (S28), and waits for the reboot by the block OS 101 (S29).

The block OS 101, for example, receives the failure notification from the hypervisor 102 by regularly checking the shared area 1530 (S42). The block OS 101 receives the request issued from the hypervisor 102 after having received the failure notification (S23), and when it is confirmed that this request has been detected (S24: YES), executes the memory dump process described using FIG. 6 (S25).

Finally, of the plurality of cores on the microprocessor 140, the block OS 101 reboots only the core used by the hypervisor 102, and ends the processing (S43). In Step S43, the block OS 101 does not reboot the core used by the block OS 101.

Figure 8:
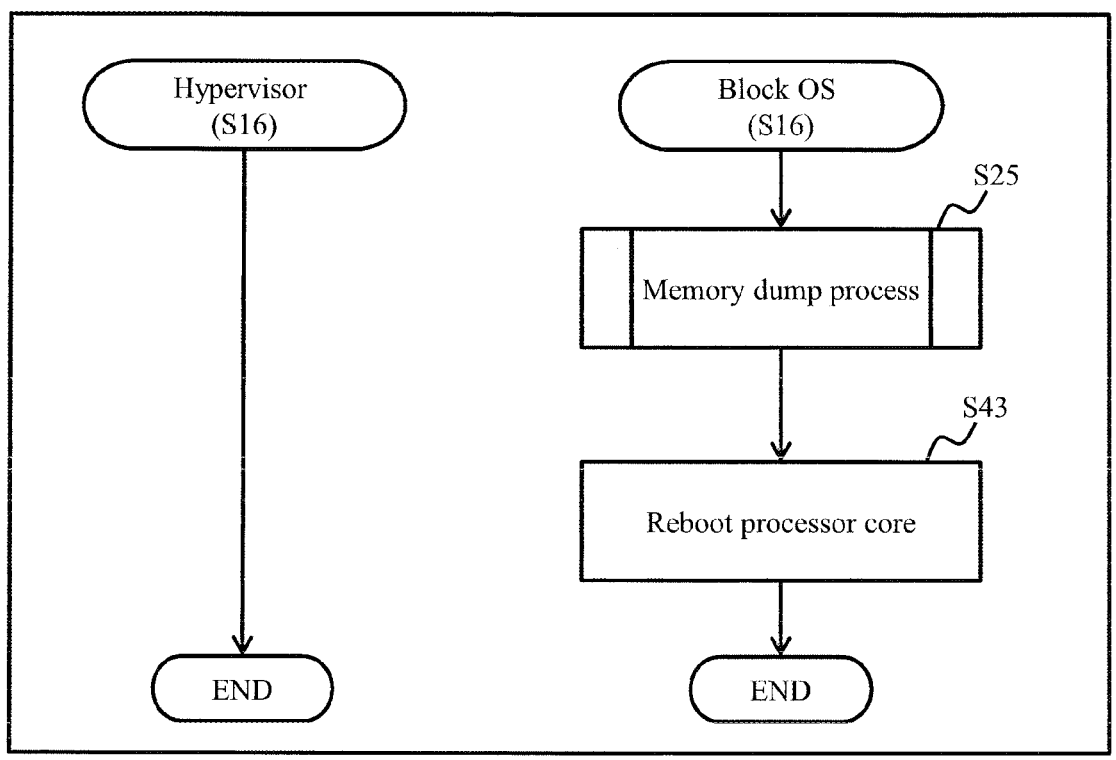
FIG. 8 is a flowchart showing Step S16 in FIG. 4 in detail.

The dump process C shown in Step S16 in FIG. 4 will be explained using the flowchart of FIG. 8. The processing of Step S16 is the dump process when the block OS 101 has detected that the hypervisor 102 is hang-up. The step is not shown on the hypervisor 102 side of FIG. 8 since the hypervisor 102 is hang-up.

The block OS 101, after executing the processing of Step S25 described in FIG. 6, reboots only the core used by the hypervisor 102 of the plurality of cores in the microprocessor 140 (S43).

In this processing, the hypervisor 102 is hang-up, and as such, it is not possible to receive a notification from the hypervisor 102 indicating the dump-target data storage destination in Step S25. Accordingly, the block OS 101 dumps all the areas of the hypervisor system information 1521.

However, when booted up, the hypervisor 102 can notify the block OS 101 beforehand of the information indicating the dump-target area. In this case, the block OS 101 can perform a dump output only of the advance-notified area of the hypervisor system information 1521.

According to this embodiment, which is configured in this way, the following effects are achieved. When a failure has occurred inside the controller 100, the controller 100 carries out a reboot after confirming that the prescribed failure processing has been completed for the block OS 101, the hypervisor 102, and the file OS 103. Therefore, according to this embodiment, it is possible to save the information required for analyzing the failure prior to rebooting, thereby increasing the efficiency of failure analysis work and improving the reliability and usability of the storage system 10.

In this embodiment, the block OS 101 reboots either all or a portion of the controller in accordance with the location of the failure after confirming that the prescribed failure processing has been completed. Therefore, according to this embodiment, it is possible to reboot the controller 100 (more specifically, the microprocessor 140) in the range required in accordance with the failure location. As a result, the occurrence of wasted downtime can be held in check, and the availability of the storage system 10 can be improved.

In this embodiment, the block OS 101 and the hypervisor 102 communicate with each other via a prescribed communication table 1531 stored in the shared area 1530. Therefore, the block OS 101 and the hypervisor 102 can exchange information using a relatively simple configuration, making it possible to simplify the configuration of the controller 100.

Figure 9:
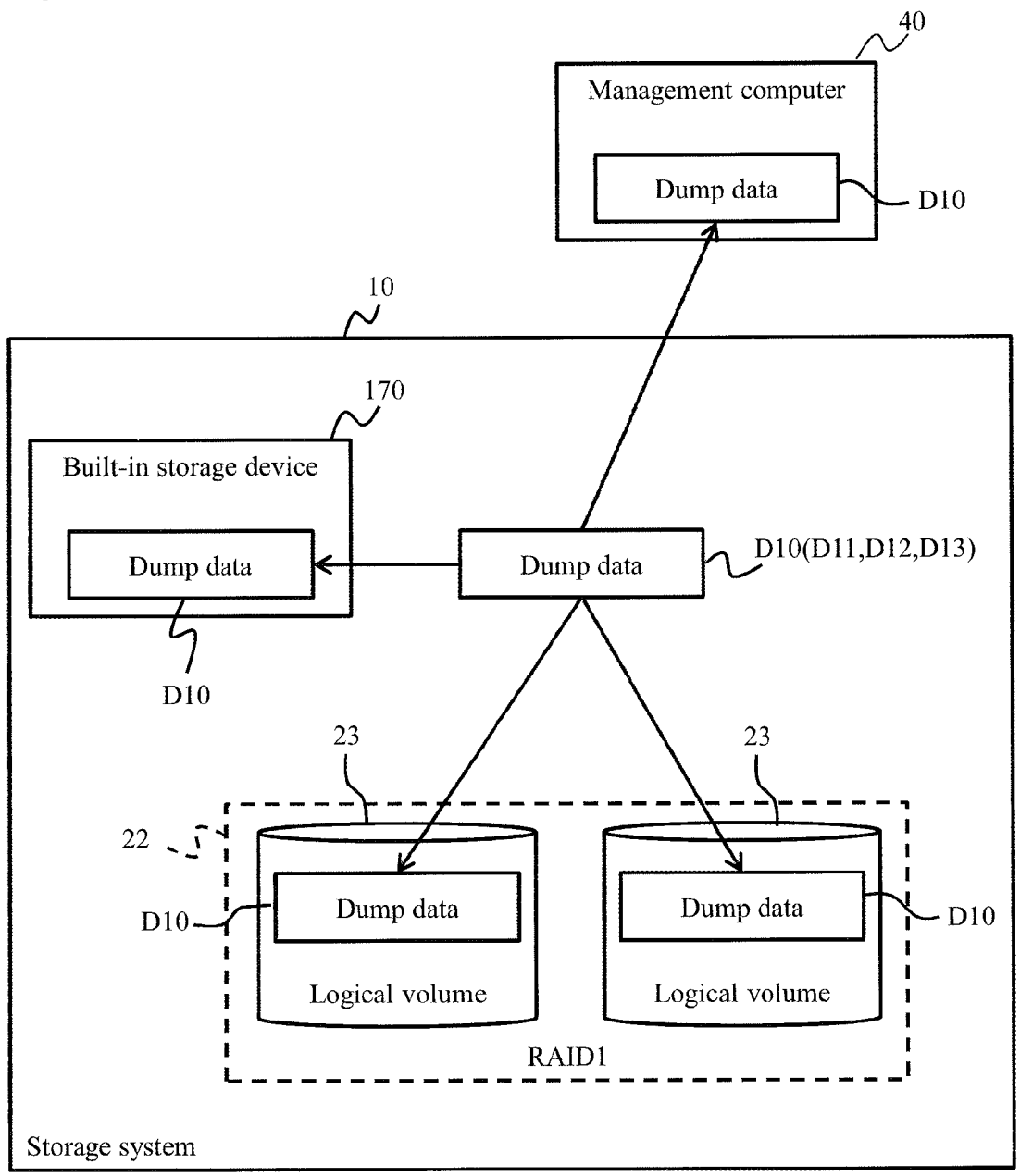
FIG. 9 is an illustration showing a variation of a method for saving dump data.

A variation of the dump data storage destination will be explained by referring to FIG. 9. The block OS dump data D11, the hypervisor dump data D12, and the file OS dump data D13 will be referred to generically here as dump data D10. However, the dump data D10 does not always include the above-described three types of data D11, D12, and D13. The dump data D10 is configured from either one of data D11 or data D12 (may include D13), or both thereof.

The dump data D10 can exist in a prescribed logical volume 23 of the plurality of logical volumes 23 of the storage system 10 as described hereinabove. The dump-destination logical volume 23 may comprise RAID 1 redundancy. The realization of redundant storage is not limited to RAID 1; RAID 5, RAID 6 and so forth are also known.

However, in a case where a failure has occurred in the block OS 101, it may not be preferable to use as the dump destination a logical volume 23 comprising a complicated RAID configuration that uses parity data. Accordingly, a RAID 1 logical volume 23 that realizes the simplest redundancy configuration is used as the dump-destination volume. However, the above description does not purport to remove a redundancy configuration other than RAID 1 from the scope of the present invention. A configuration that uses a logical volume 23 having a RAID 5 or RAID 6 configuration as the dump-destination volume is also included within the scope of the present invention.

The dump data D10 can be saved to a nonvolatile built-in storage device 170 instead of the logical volume 23. Using a built-in storage device 170 configured as a solid state drive (SSD) or the like as the dump-destination storage area makes it possible to complete dump processing in a shorter period of time than when the logical volume 23 is used.

The dump data D10 may also be saved to the management computer 40, which is external to the storage system 10. Saving the dump data D10 to the management computer 40 enables the system administrator to analyze a failure at a separate location from that of the storage system 10, improving usability. The management computer 40, for example, may be a notebook-type computer, a tablet-type computer, a mobile information terminal, or the like.

The present invention is not limited to the embodiment described hereinabove. A person skilled in the art, will be able to make various additions and changes without departing from the scope of the present invention.

REFERENCE SIGNS LIST

10 Storage system
23 Logical volume
30 Host computer
40 Management computer
100 Controller
101 Block OS
102 Hypervisor
103 File OS
120 Disk interface controller
140 Microprocessor
150 Main memory
151 Storage management information
170 Built-in storage device
1511 Block OS system information
1521 Hypervisor system information
1522 File OS system information
D11 Block OS dump data
D12 Hypervisor dump data
D13 File OS dump data

The invention claimed is:

1. A storage system having a plurality of control parts, the storage system comprising:
   a controller that has a microprocessor and a memory used by the microprocessor, the microprocessor being configured to implement the plurality of control parts to control a logical volume;
   a first control part that is included in the plurality of control parts and that is configured to control a block access request to the logical volume;
   a second control part that is included in the plurality of control parts and that is configured to control file access processing for the logical volume; and
   a third control part that is included in the plurality of control parts, the third control part being configured to manage the second control part,
   wherein, when a failure has occurred inside the controller, the controller is configured to reboot after confirming that prescribed failure processing has been completed for the first, second, and third control parts,
   wherein the first control part is configured to reboot either all or a part of the controller in accordance with the location of the failure after confirming completion of the prescribed failure processing, wherein the rebooting of either all or a part of the controller comprises rebooting either all or a prescribed part of the microprocessor by the first control part,
   wherein the prescribed failure processing includes a process for outputting prescribed information that is stored in the memory and is used in analyzing the cause of the failure,
   wherein the prescribed failure processing includes a process for the first control part to write the prescribed information to a prescribed storage area,
   wherein the prescribed information includes a prescribed first piece of information related to the first control part, a prescribed second piece of information related to the second control part, and a prescribed third piece of information related to the third control part,
   wherein the first control part, upon having detected the occurrence of a failure in the first control part, is configured to write the prescribed first piece of information, the prescribed second piece of information, and the prescribed third piece of information to the prescribed storage area, wherein the first control part, upon detecting the occurrence of a failure in the third control part, is configured to write either the prescribed third piece of information, or either of the prescribed second piece of information and the prescribed third piece of information to the prescribed storage area, and wherein the third control part, upon having detected the occurrence of a failure in the second control part, is configured to notify the first control part of the failure, and the first control part, having received the notification, is configured to write the prescribed second piece of information and the prescribed third piece of control information to the prescribed storage area.

2. A storage system according to claim 1, wherein:

the first control part, upon having detected the occurrence of a failure in the first control part, reboots the whole microprocessor after writing the prescribed first piece of information, the prescribed second piece of information, and the prescribed third piece of information to the prescribed storage area, the first control part, upon having detected the occurrence of a failure in the third control part, reboots only a portion of the microprocessor used by the third control part after writing either the prescribed third piece of information, or either of the prescribed second piece of information and the prescribed third piece of information to the prescribed storage area, and the first control part, having received the notification from the third control part, reboots only the portion of the microprocessor used by the third control part after writing the prescribed second piece of information and the prescribed third piece of information to the prescribed storage area.

3. A storage system according to claim 2, wherein the first control part and the third control part are configured to communicate with each other via a prescribed communication table stored in a shared area provided in the memory.

4. A storage system according to claim 3, wherein the prescribed storage area comprises a built-in storage device provided inside the controller.

5. A storage system according to claim 4, wherein the prescribed storage area comprises a logical volume comprising a RAID 1 redundancy configuration.

6. A storage system according to claim 1, wherein:

the controller is communicably connected to a management server, and when a failure has occurred inside the controller, the controller is configured to output prescribed information that is stored in the memory to the management server.

* * * * *